(12) United States Patent
Cha et al.

(10) Patent No.: US 9,105,107 B2
(45) Date of Patent: Aug. 11, 2015

(54) APPARATUS AND METHOD FOR IMAGE PROCESSING

(75) Inventors: Joon Hyuk Cha, Incheon-si (KR); Young Su Moon, Seoul (KR); Young Sun Jeon, Yongin-si (KR); Shi Hwa Lee, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 561 days.

(21) Appl. No.: 13/398,444

(22) Filed: Feb. 16, 2012

(65) Prior Publication Data

US 2012/0314945 A1    Dec. 13, 2012

(30) Foreign Application Priority Data

Jun. 10, 2011  (KR) ................ 10-2011-0055985

(51) Int. Cl.
G06T 3/40          (2006.01)
(52) U.S. Cl.
CPC ................... G06T 3/4038 (2013.01)
(58) Field of Classification Search
None
See application file for complete search history.

(56) References Cited

U.S. PATENT DOCUMENTS

| | | | |
|---|---|---|---|
| 6,157,747 A * | 12/2000 | Szeliski et al. ............. | 382/284 |
| 6,618,511 B1 | 9/2003 | Mancuso et al. | |
| 2005/0089244 A1 | 4/2005 | Jin et al. | |
| 2007/0159524 A1 | 7/2007 | Kim et al. | |
| 2010/0220173 A1 | 9/2010 | Anguelov et al. | |
| 2010/0271512 A1 * | 10/2010 | Garten ....................... | 348/239 |
| 2011/0310970 A1 * | 12/2011 | Lee et al. ................. | 375/240.16 |

FOREIGN PATENT DOCUMENTS

| | | |
|---|---|---|
| EP | 1903498 | 3/2008 |
| JP | 2007-324869 | 12/2007 |
| JP | 2008-3683 | 1/2008 |
| JP | 2010-108238 | 5/2010 |
| JP | 2010-147634 | 7/2010 |
| JP | 2010-220002 | 9/2010 |
| JP | 2010-283502 | 12/2010 |
| JP | 2011-82920 | 4/2011 |
| KR | 10-2009-0023635 | 3/2009 |

OTHER PUBLICATIONS

Meylan, L.—"Tone Mapping for High Dynamic Range Images"—EPFL, 2006, pp. 125-127 and 135-140.*
Heo, Y.S.—"Ghost-Free High Dynamic Range Imaging"—ACCV Computer Vision conference, Nov. 2010, pp. 486-500.*
Kang, S.—"High Dynamic Range Video"—ACM 2003, pp. 319-325.*
Uyttendaele, M.—"Eliminating Ghosting and Exposure Artifacts in Image Mosaics" 2001 IEEE, pp. 509-516.*
Extended European Search Report issued Jun. 22, 2012 in corresponding European Patent Application No. 12160024.1.

* cited by examiner

*Primary Examiner* — Bernard Krasnic
(74) *Attorney, Agent, or Firm* — Staas & Halsey LLP

(57) ABSTRACT

Apparatus and method for correcting a tone of a panoramic image. An image processing apparatus may acquire, from an overlapping region of a left image and a right image, ghost information based on an optimal threshold and a cost map in which a similarity between the left image and the right image is reflected, may generate a tone correction map based on a global tone correction function generated using the ghost information in the overlapping region, and based on a local tone correction level generated using local information of an optimal seam, and may correct the left image and the right image using a final tone correction map generated by applying, to the tone correction map, a weighting based on the left image and a weighting based on the right image.

17 Claims, 11 Drawing Sheets

FIG. 2 (CONVENTIONAL ART)
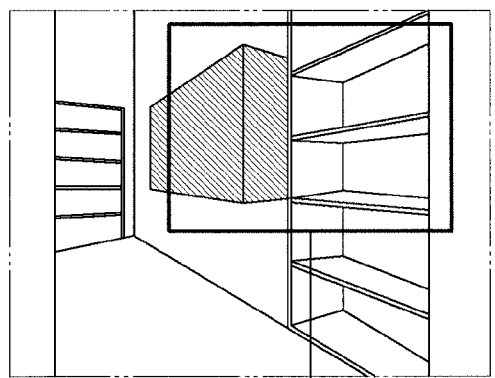 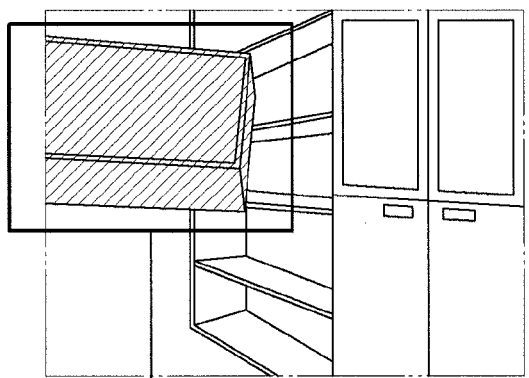
TARGET IMAGE　　　　　　　　OBJECT IMAGE
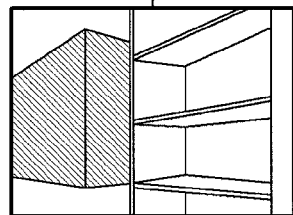 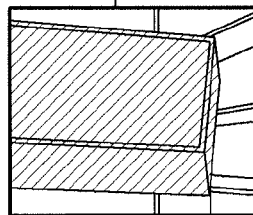

APPARATUS AND METHOD FOR IMAGE PROCESSING

CROSS-REFERENCE TO RELATED APPLICATIONS

This application claims the priority benefit of Korean Patent Application No. 10-2011-0055985, filed on Jun. 10, 2011, in the Korean Intellectual Property Office, the disclosure of which is incorporated herein by reference.

BACKGROUND

1. Field

Example embodiments of the following description relate to an apparatus and method for correcting a tone of a panoramic image, and more specifically, an apparatus and method for performing tone correction before blending a plurality of images to generate a panoramic image.

2. Description of the Related Art

A panoramic image may be generated by blending a plurality of images acquired by photographing a subject at several positions or from several angles. When the plurality of images are blended prior to a tone correction between the plurality of images, an artifact may occur at a seam connecting the plurality of images, which may cause a user to sense a difference because each of the plurality of images may have been acquired under differing conditions, such as, different exposure values, different gradations, and different lens shadings. Thus, a tone correction may need to be performed, among the plurality of images, before blending the plurality of images.

SUMMARY

The example embodiments may include an apparatus for processing an image, the apparatus including a ghost information acquisition unit to acquire, from an overlapping region of a left image and a right image, ghost information based on an optimal threshold and a cost map; a tone correction map generator to generate a tone correction map, based on a global tone correction function generated using the ghost information, and based on a local tone correction level generated using local information of an optimal seam; and a bidirectional corrector to correct the left image and the right image using a final tone correction map generated by applying, to the tone correction map, a weighting based on the left image and a weighting based on the right image.

The cost map may be generated by overlapping a region of the left image and the right image, such that a similarity between the left image and the right image is reflected on the cost map.

The left image and the right image may correspond to images acquired by photographing a stationary subject or a moving subject at a plurality of photographing positions to generate a panoramic image.

The similarity between the left image and the right image may be based on a level of color similarity and gradient similarity between the corresponding pixels in the overlapping region of the left image and the right image.

The ghost information acquisition unit may include an optimal seam assumption unit to assume a path having a greatest similarity on the cost map to be an optimal seam of the left image and the right image; and a binarization unit to generate a ghost map by binarizing the cost map, based on the optimal threshold that is estimated using an optimal threshold estimation process.

The tone correction map generator may include a global calculation unit to calculate a global tone correction function, in which a tone difference, between a pixel of the left image and a pixel of the right image, corresponding to pixels other than a ghost pixel in the overlapping region, is reflected using the ghost information.

The tone correction map generator may further include a smoothing unit to smooth a value of the calculated global tone correction function through a smoothing filter.

The tone correction map generator may include a local calculation unit to generate the local information of the optimal seam by calculating an average of tone differences between pixels other than a ghost pixel in a window of a predetermined size around a pixel of the optimal seam.

The tone correction map generator may further include a correction level calculation unit to calculate a local tone correction level by comparing local information and a value of a global tone correction function, of a pixel included in the optimal seam.

The bidirectional corrector may include a weighting application unit to apply, to the tone correction map, a weighting varying according to a distance between the left image and the overlapping region, and a weighting varying according to a distance between the right image and the overlapping region.

The example embodiments may also include a method of processing an image, the method including acquiring, from an overlapping region of a left image and a right image, ghost information, based on an optimal threshold and a cost map; generating a tone correction map, based on a global tone correction function generated using the ghost information, and based on a local tone correction level generated using local information of an optimal seam; and correcting the left image and the right image using a final tone correction map generated by applying, to the tone correction map, a weighting based on the left image and a weighting, based on the right image.

The generating of the cost map may include overlapping a region of the left image and the right image, such that a similarity between the left image and the right image is reflected on the cost map.

The acquiring may include assuming a path having a greatest similarity on the cost map to be an optimal seam of the left image and the right image, and generating a ghost map by binarizing the cost map based on the optimal threshold that is estimated using an optimal threshold estimation process.

The generating may include calculating a global tone correction function in which a tone difference between a pixel of the left image and a pixel of the right image, corresponding to pixels other than a ghost pixel in the overlapping region is reflected, using the ghost information.

The generating may include generating the local information of the optimal seam by calculating an average of tone differences between pixels other than a ghost pixel in a window of a predetermined size around a pixel of the optimal seam.

The generating of the tone correction map may further include calculating a local tone correction level by comparing local information and a value of a global tone correction function, of a pixel included in the optimal seam.

The correcting may include applying, to the tone correction map, a weighting varying according to a distance between the left image and the overlapping region and a weighting varying according to a distance between the right image and the overlapping region.

According to example embodiments, it is possible to reflect information about mismatched pixels corresponding to a plurality of images, and calculate a relatively accurate tone correction value by considering a ghost phenomenon.

According to example embodiments, it is possible to maintain a tone of an intermediate level between a left image and a right image by correcting tones of both the left image and the right image that are inputted.

According to example embodiments, it is possible to reduce an afterimage occurring due to blending since a range of the blending may not be extended to correct a tone.

According to example embodiments, it is possible to acquire a calculated value at a relatively high speed while calculating a relatively accurate tone correction value by acquiring a ghost map from a cost map based on both of a global tone correction and a local tone correction.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 2 illustrates an issue occurring due to a moving subject, according to a conventional art;

DETAILED DESCRIPTION

Figure 1:
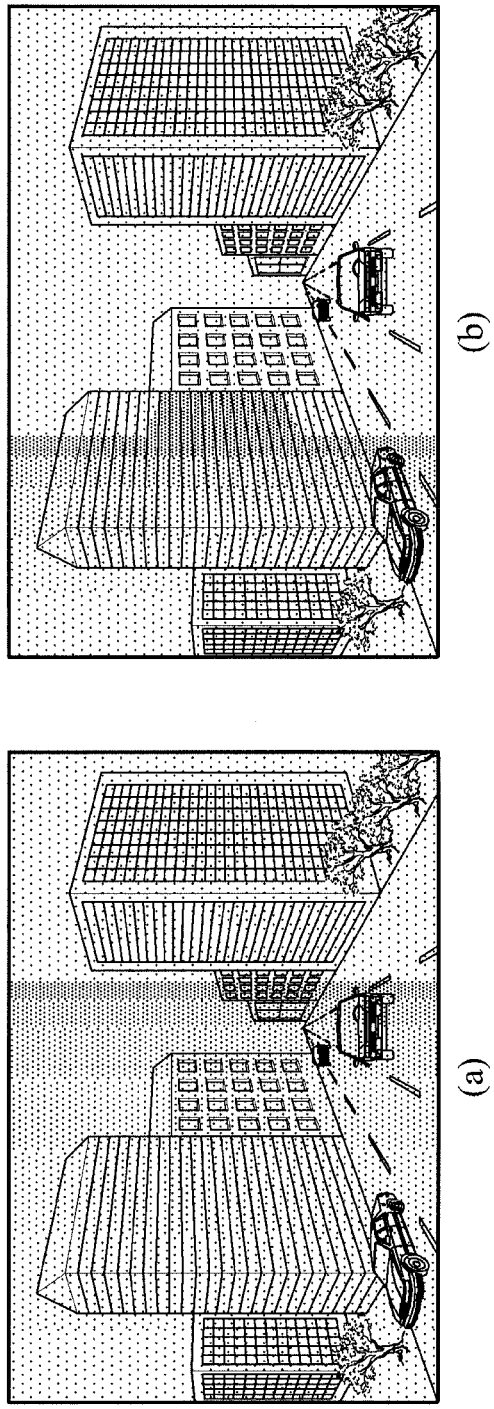
FIG. 1, parts (a) and (b), illustrate a panoramic image, according to a conventional art.

Reference will now be made in detail to embodiments, examples of which are illustrated in the accompanying drawings, wherein like reference numerals refer to the like elements throughout. Embodiments are described below to explain the present disclosure by referring to the figures.

FIGS. 1A and 1B illustrate an example of a panoramic image, according to a conventional art.

FIG. 1A illustrates a panoramic image resulting from matching two images without a tone correction. FIG. 1B illustrates a panoramic image resulting from estimating an optimal seam and matching two images without a tone correction.

An overlapping region of two images acquired by photographing the same subject may have different exposure values or different gradation levels for each image, even though both images correspond to the same subject. Thus, when each image is blended without a tone correction, an unnatural line may occur in an intermediate portion of an image, as illustrated in FIGS. 1A and 1B.

FIG. 2 illustrates an issue occurring due to a moving subject, according to a conventional art.

A panoramic image may be generated by blending a target image and an object image. In this instance, a portion inside of a box in the target image and a portion inside of a box in the object image correspond to an overlapping portion. According to a general tone correction process, a tone in the portion inside of the box in the object image may be corrected by referencing the portion inside of the box in the target image.

Referring to FIG. 2, a moving subject not visible from the portion inside of the box in the target image may be present in the portion inside of the box in the object image. Thus, the portion inside of the box in the object image and the portion inside of the box in the target image may contain different content even though the corresponding images are acquired by photographing a subject at the same location. Thus, a tone correction may not be performed since the moving subject included in the portion inside of the box in the object image is not visible from the target image. A tone correction may be performed by referencing the target image, and excluding a portion corresponding to the moving subject.

A general tone correction process may include generating a look-up table of the object image, related to the target image, through histogram matching, and correcting a tone of the object image, based on the look-up table. A general tone correction process may include correcting a region of the object image, in an overlapping region of the object image, and the target image through a histogram used for performing matching, estimating a color conversion matrix using a corrected region of the object image, and correcting a tone of the object image using the estimated color conversion matrix. A general tone correction process may include correcting a tone of the object image by calculating a weighting that uses a tone difference between the object image and the target image in a portion of a seam, and a distance from a pixel to be corrected.

Figure 3:
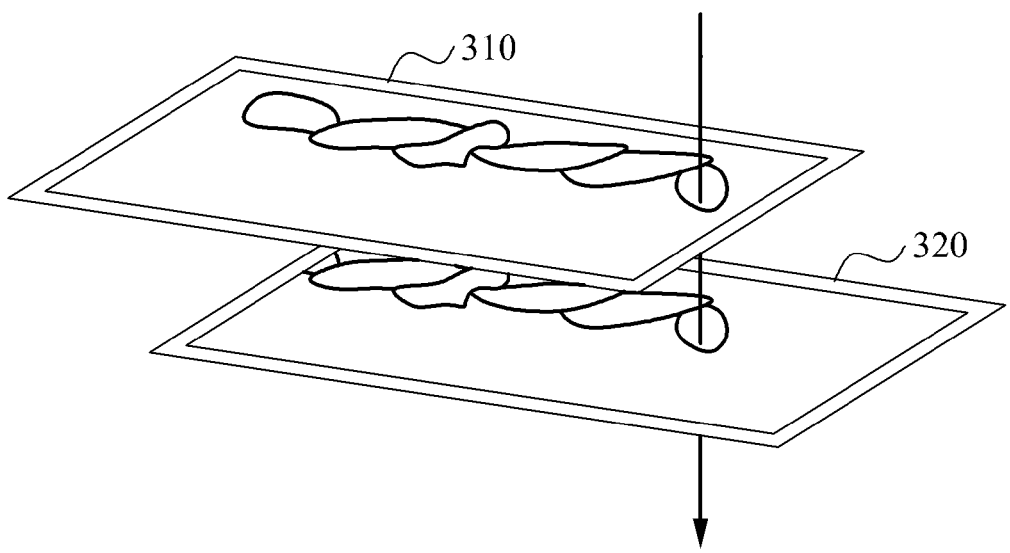
FIG. 3 illustrates pixels on the same position in an overlapping region of input images, according to a conventional art.

FIG. 3 illustrates pixels on the same position in an overlapping region of input images, according to a conventional art.

Similar to a case in which different content is present at the same position due to an occurrence of a moving object, an inaccurate tone correction may be performed due to a matching error of one to two pixels occurring in a boundary of an object, even though an image matching may be performed successfully in an overlapping region of an input image 310 and an input image 320 of FIG. 3.

A general tone correction process may have an issue, such as, an image becoming darker or brighter as a panorama may be added since a tone of an object image is corrected for a single target image only.

Figure 4:
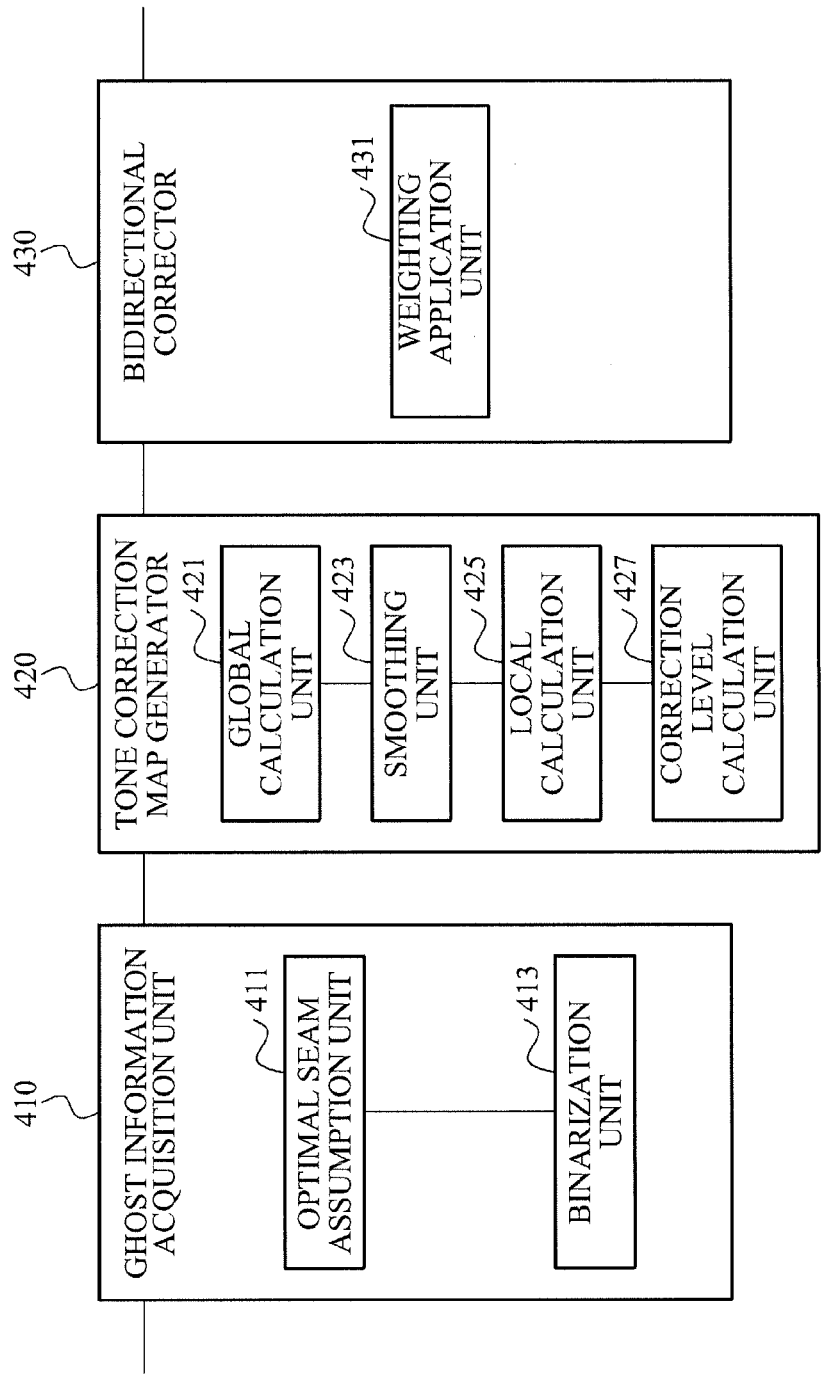
FIG. 4 illustrates an apparatus for processing an image, according to example embodiments.

FIG. 4 illustrates an apparatus for processing an image, according to example embodiments.

Referring to FIG. 4, the apparatus for processing an image (which may be referred to as an image processing apparatus, herein) may include a ghost information acquisition unit 410, a tone correction map generator 420, and a bidirectional corrector 430.

The ghost information acquisition unit 410 may generate a cost map on an overlapping region of a left image and a right image. In this case, the left image and the right image may correspond to input images. A similarity between the left image and the right image may be reflected on the cost map. To generate a panoramic image, an optimal seam estimation process may be used among processes for naturally joining a left image and a right image. The optimal seam estimation process may include estimating an optimal seam by connecting similar pixels, based on a level of color similarity and gradient similarity between pixels, corresponding to the left image and the right image in an overlapping region of the left image and the right image. The ghost information acquisition unit 410 may acquire ghost information based on an optimal threshold. The ghost information may indicate information about a region having a relatively small value of similarity between the left image and the right image. The similarity may be determined, based on various elements indicating a character of an image such as a color, saturation, brightness, and a tone of each image.

The left image and the right image may correspond to images acquired by photographing a stationary subject or a moving subject at a plurality of photographing positions. A panoramic image may be generated by putting the left image and the right image together.

The ghost information acquisition unit 410 may include an optimal seam assumption unit 411 and a binarization unit 413. The optimal seam assumption unit 411 may assume a path having a greatest similarity on the cost map to be an optimal seam of the left image and the right image. The binarization unit 413 may binarize the cost map, based on the optimal threshold that may be estimated, using an optimal threshold estimation process. A binarization of the cost map may indicate a conversion of the cost map into grayscale. The binarization unit 413 may binarize the cost map by comparing similarity of each pixel on the cost map with the optimal threshold, thereby generating a ghost map. For example, the binarization unit 413 may binarize the cost map to "1" when the similarity of each pixel on the cost map may be greater than the optimal threshold, and may binarize the cost map to "0" when the similarity of each pixel on the cost map may be less than the optimal threshold. In this instance, a portion binarized to "1" on the ghost map may be expressed in a relatively bright color, and a portion binarized to "0" on the ghost map may be expressed in a relatively dark color.

The binarization unit 413 may generate the ghost map through binarization, and thus, a complicated arithmetic operation may not be used to rapidly generate the ghost map.

The ghost map may include information about a pixel associated with a tone correction and ghost information unrelated to the tone correction. For example, a portion binarized to "1" may indicate pixels associated with the tone correction, and a portion binarized to "0" may indicate a ghost portion unrelated to the tone correction.

The tone correction map generator 420 may generate a global tone correction function based on the ghost information in the overlapping region of the left image and the right image. The global tone correction function may reflect all pixels other than a ghost pixel in the overlapping region. For example, when a panoramic image is generated in a horizontal direction using a plurality of images photographed in horizontal directions, a tone difference in a vertical direction may not be an issue while a tone difference in a horizontal direction may be an issue. The tone difference in a vertical direction may be trivial. Thus, when a panoramic image is generated in a horizontal direction, the tone correction map generator 420 may generate the global tone correction function by calculating a cumulative mean of tone differences, of portions other than a ghost pixel, in a vertical direction on the overlapping region of the left image and the right image.

The global tone correction function may reflect a tone difference between the left image and the right image in an entire overlapping region.

The tone correction map generator 420 may generate local information of the optimal seam. The local information may be generated by calculating an average of tone differences between pixels other than a ghost pixel in a window of a predetermined size around a pixel included in the optimal seam. The local information may indicate information about a tone difference between pixels included in the optimal seam. In this case, the tone difference may refer to a tone difference between a pixel of the left image and a pixel of the right image, corresponding to pixels included in the optimal seam.

The tone correction map generator 420 may generate a tone correction map based on a global tone correction function and a local tone correction level. The local tone correction level may be determined by comparing the local information and a tone difference of the global tone correction function of a predetermined pixel.

The tone correction map generator 420 may include a global calculation unit 421, a smoothing unit 423, a local calculation unit 425, and a correction level calculation unit 427.

The global calculation unit 421 may calculate a global tone correction function, in which a tone difference between a pixel of the left image and a pixel of the right image, corresponding to pixels other than a ghost pixel in the overlapping region, is reflected, using the ghost information. Information about a tone difference in each pixel other than the ghost pixel in the overlapping region may be acquired by calculating the global tone correction function.

The smoothing unit 423 may smooth a value of the global tone correction function calculated in the global calculation unit 421, through a smoothing filter. Noise may be included in a value of the calculated global tone correction function during an arithmetic operation. The smoothing unit 423 may cancel the noise through the smoothing filter.

The local calculation unit 425 may generate the local information of the optimal seam by calculating an average of tone differences between pixels other than a ghost pixel in a window of a predetermined size around a pixel of the optimal seam. For example, the local calculation unit 425 may use a window having a size of N×N for each pixel included in the optimal seam, and calculate an average of tone differences between pixels other than the ghost pixel in the window having a size of N×N, thereby acquiring the local information of each pixel.

The correction level calculation unit 427 may calculate a local tone correction level by comparing local information and a value of a global tone correction function, of a pixel included in the optimal seam. The global tone correction function may reflect information associated with a tone difference for an entire overlapping region of the left image and the right image. The local information may reflect information about a tone difference of a pixel included in the optimal seam so that a pixel included in the optimal seam may have a similar tone difference to a neighboring pixel. For example, the correction level calculation unit 427 may calculate the local tone correction level by subtracting a value of the global tone correction function from the local information.

The tone correction map generator 420 may generate a tone correction map by adjusting the global tone correction function by the local tone correction level.

The bidirectional corrector 430 may correct the left image and the right image using a final tone correction map generated by applying, to the tone correction map, a weighting based on the left image and a weighting based on the right image. The tone correction map may be reflected in the left image and the right image. The tone correction map may indicate information of a tone difference for the overlapping region of the left image and the right image. In this instance, a weighting according to a distance between the left image and the overlapping image may be applied to the tone correction map reflected in the left image so that a tone may be naturally formed from the left image. A weighting according to a distance between the right image and the overlapping image may be applied to the tone correction map reflected in the right image so that a tone may be naturally formed from the right image.

The bidirectional corrector 430 may include a weighting, application unit 431. The weighting application unit 431 may apply, to the tone correction map, a weighting varying according to a distance between the left image and the overlapping region. The weighting application unit 431 may apply, to the tone correction map, a weighting varying according to a distance between the right image and the overlapping region.

The bidirectional corrector 430 may correct a tone of the left image and the right image, based on the final tone correction map. The image processing apparatus may generate a panoramic image by blending the left image and the right image that are corrected.

The bidirectional corrector 430 may enable an overall panoramic image to maintain a uniform tone by correcting each tone of the left image and the right image, in comparison with a general process of correcting a tone of an object image according to a tone of a target image.

Figure 5:
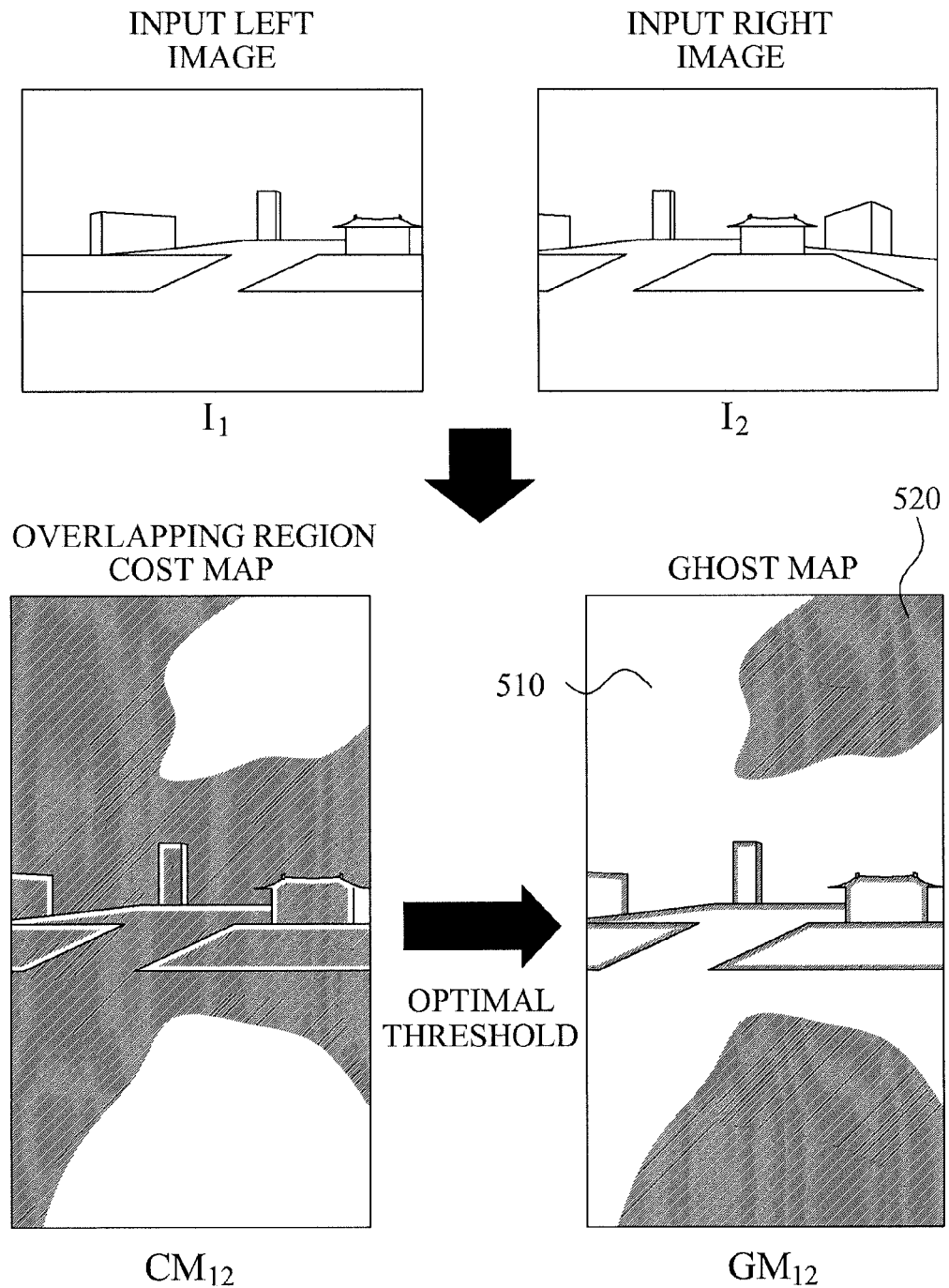
FIG. 5 illustrates an operation of generating a ghost map, according to example embodiments.

FIG. 5 illustrates an operation of generating a ghost map, according to example embodiments.

An image processing apparatus may receive an input of a left image $I_1$ and a right image $I_2$, and generate a cost map $CM_{12}$ for an overlapping region. The cost map $CM_{12}$ may be generated by reflecting similarity between the left image $I_1$ and the right image $I_2$ in the overlapping region. For example, in the cost map $CM_{12}$, a portion expressed in a relatively bright color may indicate a portion having relatively low similarity between the left image $I_1$ and the right image $I_2$, and a portion expressed in a relatively dark color may indicate a portion having relatively high similarity between the left image $I_1$ and the right image $I_2$.

The image processing apparatus may generate a ghost map $GM_{12}$ by binarizing the $CM_{12}$ based on an optimal threshold. That is, the optimal threshold may be determined by an optimal threshold estimation process, and the optimal threshold estimation process may correspond to a technology widely used in an image processing field, and thus, further description will be omitted for conciseness.

Ghost information may be included in the ghost map $GM_{12}$. In this case, the ghost information may correspond to information unrelated to a tone correction of an image. The image processing apparatus may easily generate the ghost map $GM_{12}$ from the cost map $CM_{12}$ through binarization. In the ghost map $GM_{12}$, a bright region 510 may correspond to a region associated with a tone correction in an overlapping region of the left image $I_1$ and the right image $I_2$, and a dark region 520 may correspond to a region unrelated to the tone correction in the overlapping region of the left image $I_1$ and the right image $I_2$.

Figure 6:
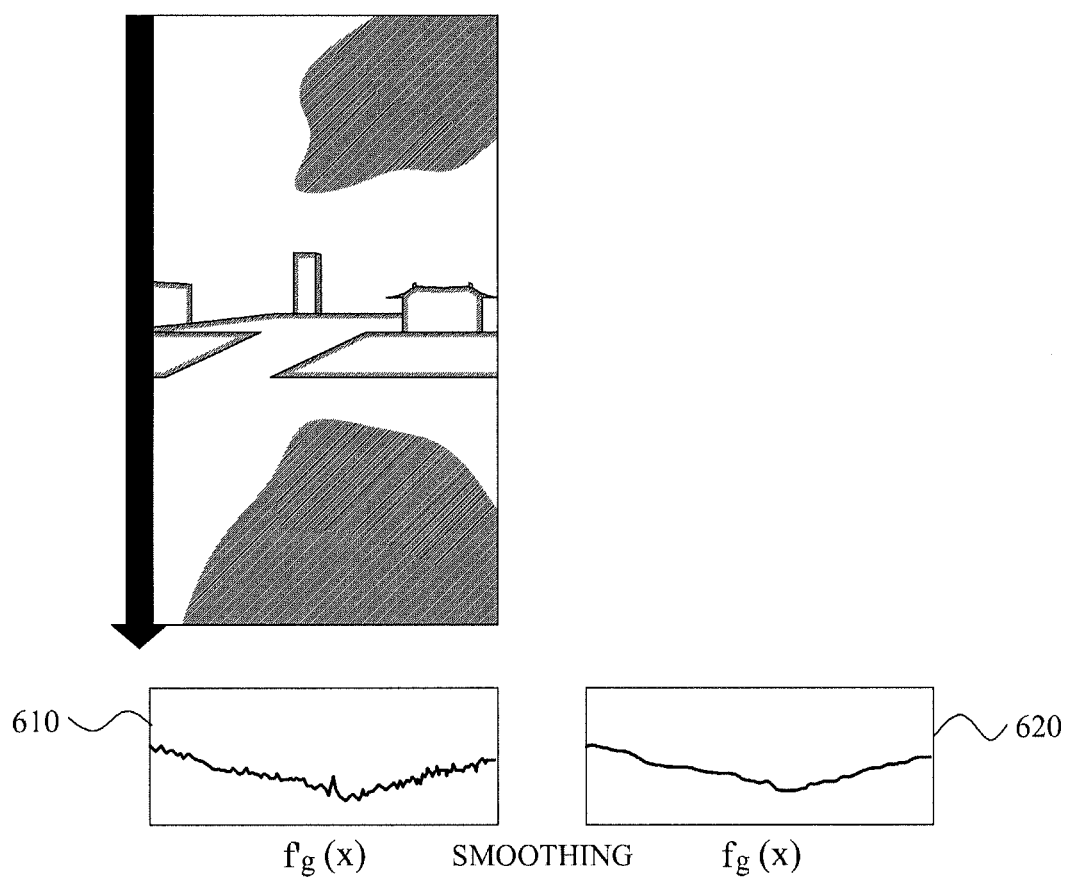
FIG. 6 illustrates an operation of generating a global tone correction function, according to example embodiments.

FIG. 6 illustrates an operation of generating a global tone correction function, according to example embodiments.

FIG. 6 illustrates a ghost map generated in an overlapping region of a left image and a right image when a panoramic image is generated in a horizontal direction using the left image and the right image. When the panoramic image is generated in a horizontal direction, a tone difference in a vertical region may vary by relatively less in the overlapping region. Thus, generating the global tone correction function for the tone difference in a horizontal direction may be sufficient for expressing a variation of the tone difference of the overlapping region.

The image processing apparatus may generate the global tone correction function in a horizontal direction by calculating a cumulative mean of tone differences of pixels, other than a ghost pixel in a vertical direction, indicated by a direction of an arrow on the ghost map. In this instance, the tone differences may indicate tone differences between pixels corresponding to the left image and the right image.

The image processing apparatus may generate a global tone correction function $f_g(x)$ in a horizontal direction, using values of the cumulative mean. The image processing apparatus may cancel noise included in $f'_g(x)$ by performing a smoothing filtering on $f'_g(x)$. $f_g(x)$ may be generated as a result of the smoothing filtering performed on $f'_g(x)$. $f'_g(x)$ and $f_g(x)$ may be expressed by the following Equations.

$$f'_g(x) = \frac{1}{H}\sum_{y=0}^{h}(I_1(x,y) - I_2(x,y))(GM_{12}(x,y))$$

$$H = \sum_{y=0}^{h}(GM_{12}(x,y))$$

$$f_g(x) = \frac{1}{2n+1}\sum_{i=-n}^{n}(f'_g(x+i))$$

In this case, $I_1(x, y)$ denotes a tone of a pixel in the left image, $I_2(x, y)$ denotes a tone of a pixel in the right image, $GM_{12}(x, y)$ denotes whether a pixel of the ghost map corresponds to the ghost pixel. When the pixel of the ghost map corresponds to a ghost pixel, $GM_{12}(x, y)$ may be "0." H denotes a sum of pixels other than the ghost pixel when the cumulative mean is calculated in a vertical direction on the ghost map. "h" denotes a number of pixels in a horizontal direction on the ghost map. "n" denotes a size of the smoothing filter.

Referring to FIG. 6, a graph 610 illustrates a result of calculating the global tone correction function in a horizontal direction based on information about the ghost map, and a graph 620 illustrates a result of calculating the smoothed global tone correction function.

Figure 7:
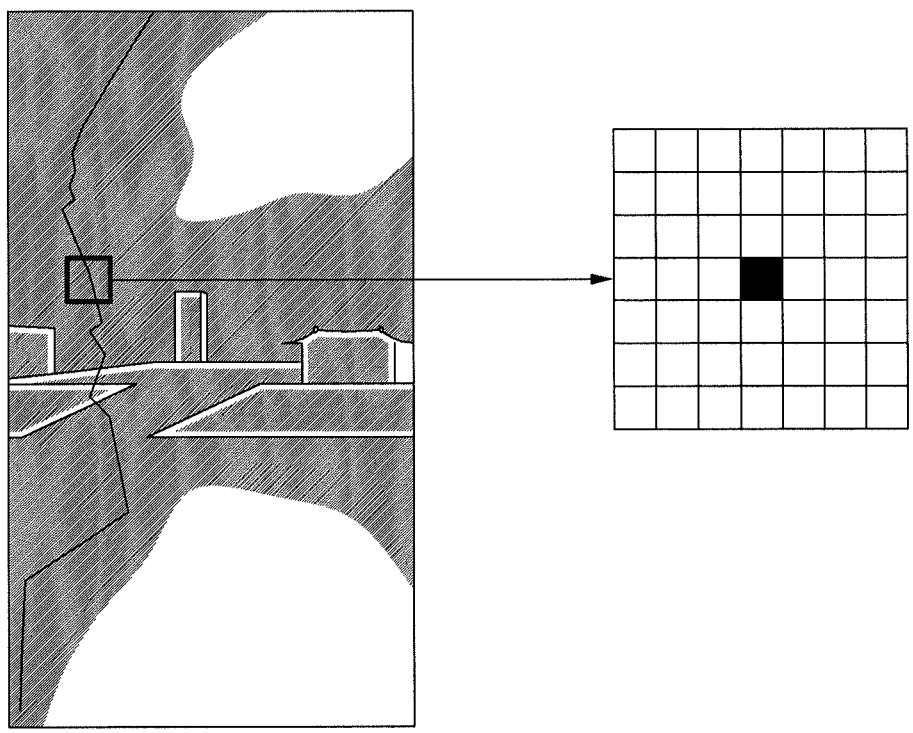
FIG. 7 illustrates an operation of generating local information of an optimal seam, according to example embodiments.

FIG. 7 illustrates an operation of generating local information of an optimal seam, according to example embodiments.

A curved line drawn in a vertical direction on a cost map of FIG. 7 may indicate an optimal seam that occurs when a left image and a right image are joined. An image processing apparatus may acquire local information TD(x, y) by calculating an average of tone differences between pixels other than a ghost pixel in a window of a predetermined size around a pixel included in the optimal seam. The local information TD(x, y) may indicate information used to correct a tone of a pixel included in the optimal seam to be similar to a neighboring pixel. The image processing apparatus may acquire information about the ghost pixel from a ghost map. The local information TD(x, y) may be expressed by the following Equation.

$$TD(x,y) = \frac{1}{W}\sum_{i=-n}^{n}\sum_{j=-n}^{n}((I_1(x+j, y+i) - I_2(x+j, y+i))(GM_{12}(x+j, y+i))$$

In this case, W denotes a number of pixels other than the ghost pixel in a window of a predetermined size, $I_1(x+j, y+i)$ denotes a tone of a pixel of the left image in the window, $I_2(x+j, y+i)$ denotes a tone of a pixel of the right image in the window, and $GM_{12}(x+j, y+i)$ denotes whether a pixel of the ghost map corresponds to the ghost pixel in the window.

Figure 8:
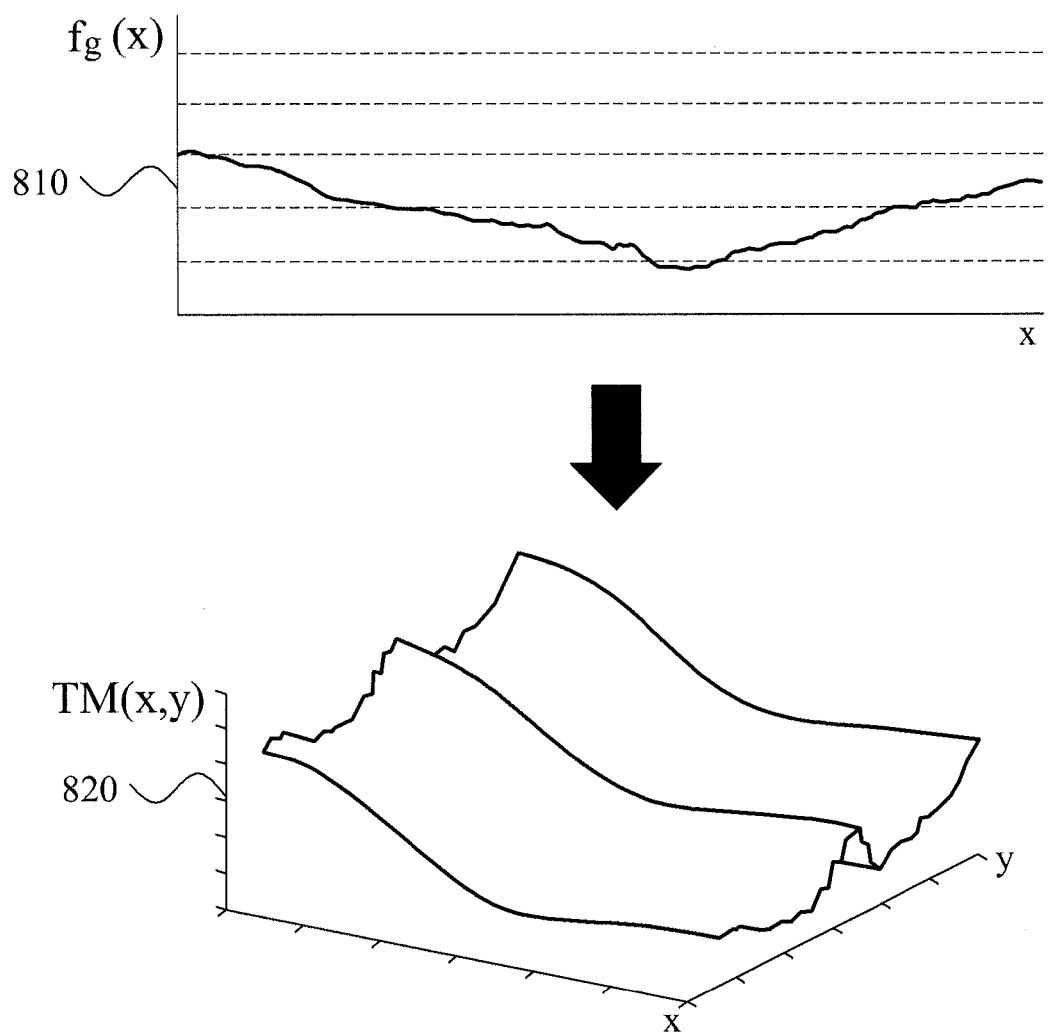
FIG. 8 illustrates a tone correction map, according to example embodiments.

FIG. 8 illustrates a tone correction map, according to example embodiments.

Referring to FIG. 8, an image processing apparatus may generate a tone correction map TM(x, y) by compensating a global tone correction function $f_g(x)$ by a local tone correction level TC(y). In this instance, the local tone correction level TC(y) may be calculated by subtracting the global tone correction function $f_g(x)$ from local information TD(x, y). The local tone correction level TC(y) may be expressed as shown below.

$$TC(y)=TD(x,y)-f_g(x)$$

The tone correction map TM(x, y) may be calculated by adding the local tone correction level TC(y) to the global tone correction function $f_g(x)$. The tone correction map TM(x, y) may be expressed as shown below.

$$TM(x,y)=f_g(x)+TC(y)$$

A graph 810 illustrates a result obtained by calculating the global tone correction function $f_g(x)$, and a graph 820 illustrates a result obtained by calculating the tone correction map TM(x, y).

Figure 9:
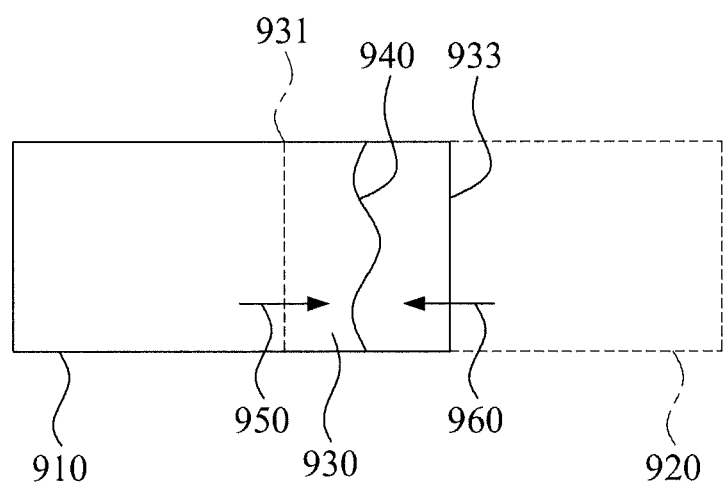
FIG. 9 illustrates a bidirectional correction of an input left image and an input right image, according to example embodiments.

FIG. 9 illustrates a bidirectional correction of an input left image and right image, according to example embodiments.

Referring to FIG. 9, when a tone correction map TM(x, y) is determined on an overlapping region 930 of a left image 910 and a right image 920, a weighting may be applied so that a tone correction may be naturally performed from the left image 910 to the overlapping region 930. A weighting may be applied so that a tone correction may be naturally performed from the right image 920 to the overlapping region 930. An optimal seam 940 may be present in the overlapping region 930.

A weighting $w_1(x)$ may be determined based on a portion 931 connecting the left image 910 and the overlapping region 930. The weighting $w_1(x)$ may be determined in proportion to a width of the overlapping region 930 in a direction 950. The weighting $w_1(x)$ may be expressed as shown below.

$$w_1(x) = \frac{x}{\text{width}} (0 \le x \le \text{width})$$

A weighting $w_2(x)$ may be determined based on a portion 933 connecting the right image 920 and the overlapping region 930. The weighting $w_2(x)$ may be determined in proportion to a width of the overlapping region 930 in a direction 960. The weighting $w_2(x)$ may be expressed as shown below.

$$w_2(x) = \frac{\text{width} - x}{\text{width}} (0 \le x \le \text{width})$$

An image processing apparatus may generate a final tone correction map $TM_1(x, y)$ to be used for a tone correction of the left image 910 by applying the weighting $w_1(x)$ to the tone correction map TM(x, y). The image processing apparatus may generate a final tone correction map $TM_2(x, y)$ to be used for a tone correction of the right image 920 by applying the weighting $w_2(x)$ to the tone correction map TM(x, y). The final tone correction map $TM_1(x, y)$ and the final tone correction map $TM_2(x, y)$ may be expressed as shown below.

$$TM_1(x,y)=TM(x,y) \times w_1(x)$$

$$TM_2(x,y)=TM(x,y) \times w_2(x)$$

The image processing apparatus may acquire a left image $I'_1(x, y)$ having a tone finally corrected by subtracting the final tone correction map $TM_1(x, y)$ from the left image 910 or adding the final tone correction map $TM_1(x, y)$ to the left image 910. The image processing apparatus may acquire a right image $I'_2(x, y)$ having a tone finally corrected by subtracting the final tone correction map $TM_2(x, y)$ from the right image 920 or adding the final tone correction map $TM_2(x, y)$ to the right image 920. For example, the left image $I'_1(x, y)$ having a tone finally corrected and the right image $I'_2(x, y)$ having a tone finally corrected may be expressed as shown below.

$$I'_1(x,y)=I_1(x,y)-TM_1(x,y)$$

$$I'_2(x,y)=I_2(x,y)+TM_2(x,y)$$

The image processing apparatus may generate a panoramic image by blending the left image $I'_1(x, y)$ having a tone finally corrected and the right image $I'_2(x, y)$ having a tone finally corrected.

Figure 10:
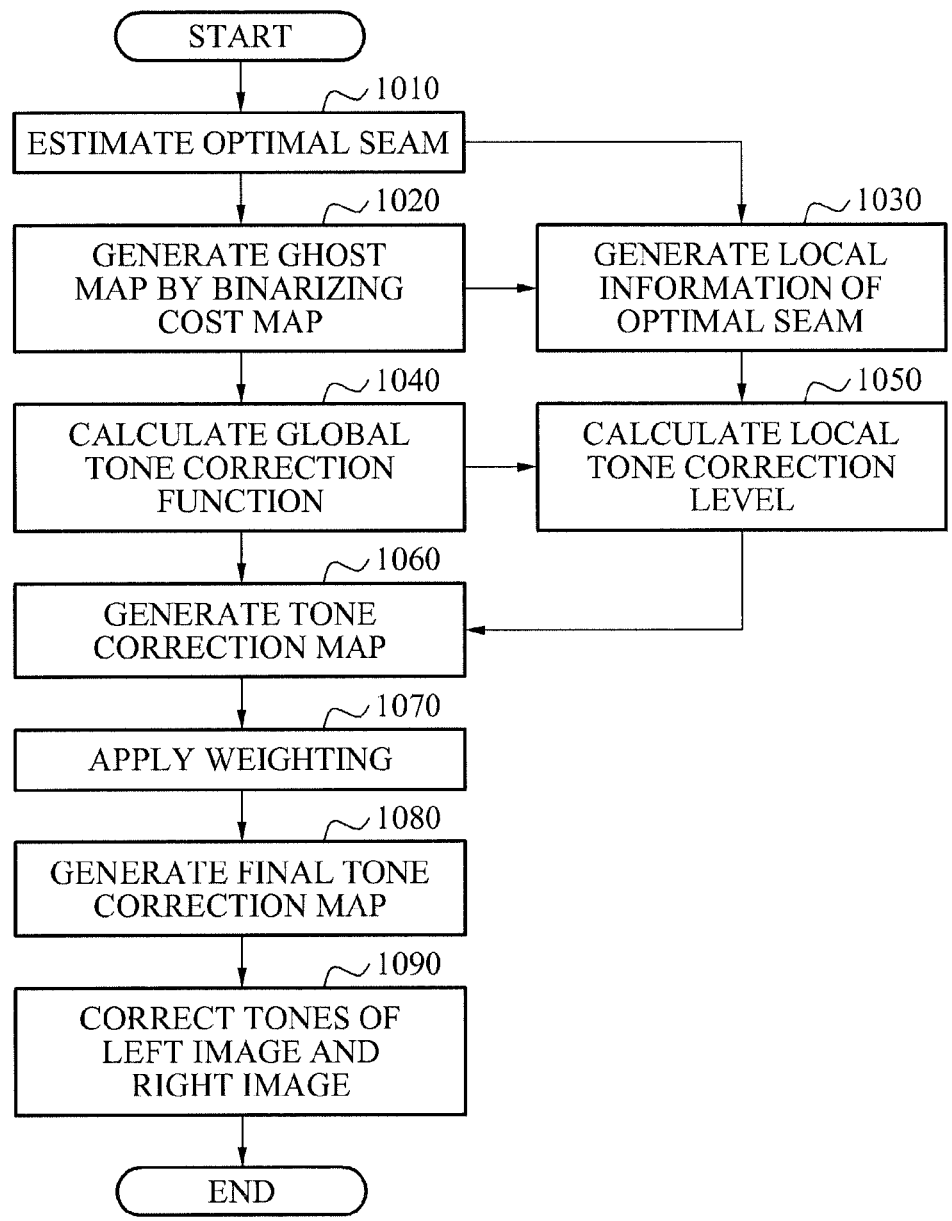
FIG. 10 illustrates an image processing method, according to example embodiments.

FIG. 10 illustrates an image processing method, according to example embodiments.

In operation 1010, an image processing apparatus may estimate an optimal seam of a left image and a right image using an optimal seam estimation process. In this case, the left image and the right image may correspond to input images. The optimal seam estimation process may include estimating an optimal seam by connecting similar pixels, based on a level of color similarity and gradient similarity between pixels corresponding to a left image and a right image in an overlapping region of the left image and the right image.

In operation 1020, the image processing apparatus may generate a ghost map by binarizing a cost map. A similarity between the left image and the right image may be reflected in the cost map. The image processing apparatus may binarize the cost map based on an optimal threshold. The image processing apparatus may binarize the cost map by comparing a similarity of each pixel on the cost map with the optimal threshold, thereby generating a ghost map.

In operation 1030, the image processing apparatus may generate local information of the optimal seam. In particular, the image processing apparatus may generate local information of pixels included in the optimal seam. In this instance, the image processing apparatus may generate the local information by calculating an average of tone differences between pixels other than a ghost pixel in a window of a predetermined size around a pixel of the optimal seam. Information about the ghost pixel may be acquired from the ghost map.

In operation 1040, the image processing apparatus may calculate a global tone correction function. The image processing apparatus may calculate a global tone correction function in a horizontal direction, based on information from the ghost map. A tone difference may be reflected in the global tone correction function based on pixels other than the ghost pixel in the overlapping region of the left image and the right image.

In operation 1050, the image processing apparatus may calculate a local tone correction level, based on the local information and the global tone correction function. The local tone correction level may be used for enhancing accuracy of a tone correction of a pixel included in the optimal seam on the overlapping region.

In operation 1060, the image processing apparatus may generate a tone correction map by compensating the global tone correction function by the local tone correction level.

In operation 1070, the image processing apparatus may apply, to the tone correction map, a weighting based on the left image and a weighting based on the right image.

In operation 1080, the image processing apparatus may generate a final tone correction map to be used for the left image and a final tone correction map to be used for the right image, based on a weighting applied to the tone correction map.

In operation 1090, the image processing apparatus may correct a tone of the left image and right image using the corresponding final tone correction map.

Figure 11:
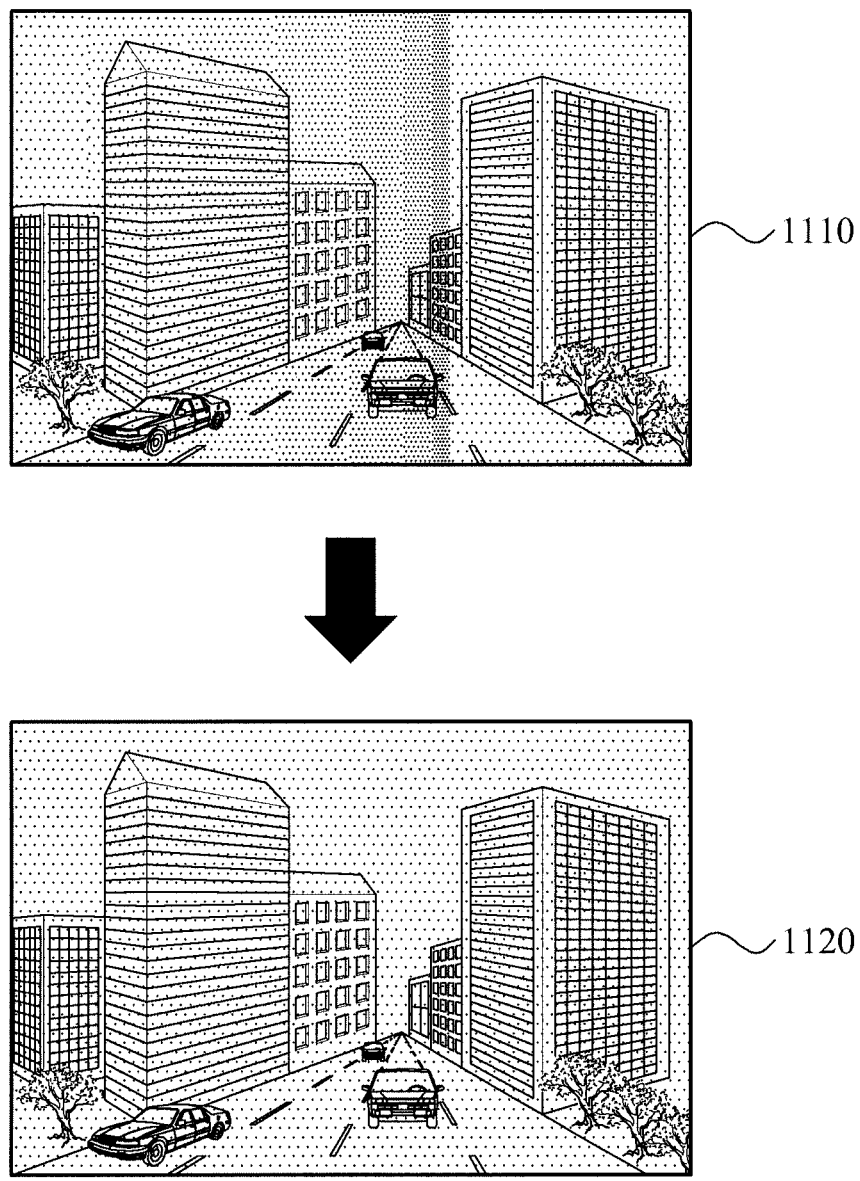
FIG. 11 illustrates a panoramic image having a corrected tone, according to example embodiments.

FIG. 11 illustrates a panoramic image having a corrected tone according to example embodiments.

An image 1110 corresponds to a panoramic image generated by estimating an optimal seam of a left image and a right image, and blending the left image and the right image. An image 1120 corresponds to a panoramic image generated by correcting a tone of a left image and right image based on a final tone correction map according to example embodiments, and blending the left image and the right image. Referring to FIG. 11, the image 1120 may have a natural tone when compared to the image 1110.

The method of processing an image according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of the magnetic recording apparatus include a hard disk device (HDD), a flexible disk (FD), and a magnetic tape (MT). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Further, according to an aspect of the embodiments, any combinations of the described features, functions and/or operations can be provided.

Moreover, the image processing apparatus, as shown in FIG. 4, for example, may include at least one processor to execute at least one of the above-described units and methods.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An apparatus for processing an image, the apparatus comprising:
   a ghost information acquisitor, including at least one processor, configured to acquire, from an overlapping region of a left image and a right image of a panoramic image, ghost information related to a ghost pixel based on a threshold and a cost map;
   a tone correction map generator, including the at least one processor, configured to generate a tone correction map, based on a global tone correction function generated using pixels other then the ghost pixel in the overlapping region, and based on a local tone correction level generated using local information of a seam that connects the left image and the right image; and
   a bidirectional corrector, including the at least one processor, configured to generate a final tone correction map corresponding to the overlapping region by applying, to the tone correction map, a weighting based on the left image and a weighting based on the right image, and correct the left image and the right image using the final tone correction map.

2. The apparatus of claim 1, wherein the cost map is generated by overlapping a region of the left image and the right image, such that a similarity between the left image and the right image is reflected on the cost map.

3. The apparatus of claim 1, wherein the left image and the right image correspond to images acquired by photographing a stationary subject or a moving subject at a plurality of photographing positions.

4. The apparatus of claim 2, wherein the similarity between the left image and the right image is based on a level of color similarity and gradient similarity, among corresponding pixels in the overlapping region of the left image and the right image.

5. The apparatus of claim 1, wherein the ghost information acquisitor comprises:
   a seam assumer configured to assume a path having a greatest similarity on the cost map to be the seam of the left image and the right image; and
   a binarizer configured to generate a ghost map by binarizing the cost map, based on the threshold that is estimated using a threshold estimation process.

6. The apparatus of claim 1, wherein the tone correction map generator comprises:
   a global calculator configured to calculate the global tone correction function using pixels other than the ghost pixel in the overlapping region,
   wherein the global tone correction function is calculated, such that a tone difference between a pixel of the left image and a pixel of the right image corresponding to pixels other than the ghost pixel in the overlapping region is reflected.

7. The apparatus of claim 6, wherein the tone correction map generator further comprises:
   a smoother configured to smooth a value of the calculated global tone correction function through a smoothing filter.

8. The apparatus of claim 1, wherein the tone correction map generator comprises:
   a local calculator configured to generate the local information of the seam by calculating an average of tone differences between pixels, other than the ghost pixel in a window of a predetermined size, around a pixel of the seam.

9. The apparatus of claim 8, wherein the tone correction map generator further comprises:
   a correction level calculator configured to calculate the local tone correction level by comparing local information and a value of the global tone correction function, of a pixel included in the seam.

10. The apparatus of claim 1, wherein the bidirectional corrector comprises:
    a weighting applier configured to apply, to the tone correction map, a weighting varying according to a distance between the left image and the overlapping region and a weighting varying according to a distance between the right image and the overlapping region.

11. A method of processing an image, the method comprising:
    acquiring, from an overlapping region of a left image and a right image of a panoramic image, ghost information related to a ghost pixel, based on a threshold and a cost map;
    generating a tone correction map, based on a global tone correction function generated using pixels other than the ghost pixel in the overlapping region, and based on a local tone correction level generated using local information of a seam that connects the left image and the right image;
    generating a final tone correction map corresponding to the overlapping region by applying, to the tone correction map, a weighting based on the left image and a weighting based on the right image; and
    correcting the left image and the right image using the final tone correction map.

12. The method of claim 11, wherein the cost map is generated by overlapping a region of the left image and the right image, such that a similarity between the left image and the right image is reflected on the cost map.

13. The method of claim 11, wherein the acquiring comprises:
    assuming a path having a greatest similarity on the cost map to be the seam of the left image and the right image; and
    generating a ghost map by binarizing the cost map based on the threshold that is estimated using a threshold estimation process.

14. The method of claim 11, wherein the generating comprises:
    calculating the global tone correction function using pixels other than the ghost pixel in the overlapping region,
    wherein the global tone correction function is calculated, such that a tone difference between a pixel of the left image and a pixel of the right image, corresponding to pixels other than the ghost pixel in the overlapping region, is reflected.

15. The method of claim 11, wherein the generating comprises:
    generating the local information of the seam by calculating an average of tone differences between pixels, other than the ghost pixel, in a window of a predetermined size around a pixel of the seam.

16. The method of claim 15, wherein the generating of the tone correction map further comprises:
    calculating the local tone correction level by comparing local information and a value of the global tone correction function, of a pixel included in the seam.

17. The method of claim 11, wherein the correcting comprises:
    applying, to the tone correction map, a weighting varying according to a distance between the left image and the overlapping region and a weighting varying according to a distance between the right image and the overlapping region.

* * * * *